United States Patent
Ouarraoui et al.

(10) Patent No.: US 10,303,458 B2
(45) Date of Patent: May 28, 2019

(54) MULTI-PLATFORM INSTALLER

(71) Applicant: HEWLETT PACKARD ENTERPRISE DEVELOPMENT LP, Houston, TX (US)

(72) Inventors: Amine Ouarraoui, Waltham, MA (US); Hugh Jeffrey Small, Northborough, MA (US); Paul Cevoli, Bridgewater, MA (US); Junfeng Song, Southborough, MA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 15/280,347

(22) Filed: Sep. 29, 2016

(65) Prior Publication Data
US 2018/0088932 A1    Mar. 29, 2018

(51) Int. Cl.
*G06F 9/445* (2018.01)
*G06F 8/654* (2018.01)
(Continued)

(52) U.S. Cl.
CPC ............ *G06F 8/654* (2018.02); *G06F 3/0605* (2013.01); *G06F 3/0632* (2013.01);
(Continued)

(58) Field of Classification Search
CPC ... G06F 8/61; G06F 8/665; G06F 8/67; G06F 3/0607; G06F 3/0619; G06F 3/0665;
(Continued)

(56) References Cited

U.S. PATENT DOCUMENTS 7,103,595 B2   9/2006 Anastasiadis et al.
7,139,781 B2   11/2006 Young
(Continued)

OTHER PUBLICATIONS

Capek et al., "Red Hat Enterprise Linux 7—Installation Guide", 2015, Red Hat, Inc., Chapters 1-6, and 15-24, pp. 6-102, 215-412.*
(Continued)

*Primary Examiner* — Ted T. Vo
(74) *Attorney, Agent, or Firm* — Hewlett Packard Enterprise Patent Department

(57) ABSTRACT

Systems, methods, and computer-readable storage media for multi-platform installers. In some embodiments, a computing system can launch a software package configured to perform a software installation at the computing system. The software package can then detect an underlying computing environment associated with the computing system, the underlying computing environment including a type of system, software characteristics, and/or hardware characteristics. Based on the detected underlying computing environment, the software package can select settings for a configuration update on the computing system. The settings can define network configuration parameters, system firmware parameters, drive configuration parameters, system boot drive configuration parameters, etc. Based on the settings, the software package can execute the configuration update on the computing system, and install a software application on the computing system, based on the configuration update.

26 Claims, 5 Drawing Sheets

(51) Int. Cl.
    *G06F 3/06*     (2006.01)
    *G06F 8/61*     (2018.01)
    *G06F 8/656*    (2018.01)

(52) U.S. Cl.
    CPC .............. *G06F 3/0689* (2013.01); *G06F 8/61*
            (2013.01); *G06F 8/656* (2018.02); *G06F*
                                    *9/44505* (2013.01)

(58) Field of Classification Search
    CPC ........ G06F 3/0689; G06F 8/654; G06F 8/656;
                    G06F 3/0605; G06F 3/0632; G06F
                                            9/44505
    USPC ................................................. 717/174–178
    See application file for complete search history.

(56) References Cited

U.S. PATENT DOCUMENTS

| | | | |
|---|---|---|---|
| 7,266,817 B1* | 9/2007 | Barrett ...................... | G06F 8/71 |
| | | | 717/120 |
| 7,454,592 B1 | 11/2008 | Shah | |
| 7,747,663 B2 | 6/2010 | Atkin | |
| 7,814,078 B1 | 10/2010 | Forman | |
| 8,028,106 B2 | 9/2011 | Bondurant et al. | |
| 8,140,625 B2 | 3/2012 | Dubnicki | |
| 8,140,786 B2 | 3/2012 | Bunte et al. | |
| 8,478,799 B2 | 7/2013 | Beaverson et al. | |
| 8,607,223 B2* | 12/2013 | Fors ........................... | G06F 8/64 |
| | | | 717/168 |
| 2003/0208685 A1* | 11/2003 | Abdel-Rahman ......... | G06F 8/61 |
| | | | 717/168 |
| 2004/0148306 A1 | 7/2004 | Moulton | |
| 2006/0036898 A1 | 2/2006 | Doering | |
| 2008/0028390 A1* | 1/2008 | Fors ........................... | G06F 8/61 |
| | | | 717/174 |
| 2014/0040877 A1* | 2/2014 | Goldman ................... | G06F 8/61 |
| | | | 717/174 |

OTHER PUBLICATIONS

Springpath Inc.'s Preliminary Invalidity Contentions, C.A. No. 4:15-cv-13345-TSH Document 101, filed Mar. 21, 2017 in the US Disctrict Court for the District of Massachusetts and Exhibit A1, listing references cited herein.
Li et al., Secure Untrusted Data Repository (SUNDR), 2004 ("Li")(SPR00000113-PR000000128).
Sandberg et al., Design and implementation of the Sun network filesystem, 1985 ("Sandberg")(SPR00000129-SPR00000140).
Quinlan et al., Venti: A New Approach to Archival Storage, 2002 ("Quinlan")(SPR00000141-SPR00000154).
Best et al., JFS Layout: How the Journaled File System Handles the On-Disk Layout, 2000 ("Best")(SPR00000155-SPR00000197).
Zhu et al., Avoiding the Disk Bottleneck in the Data Domain Deduplication File System, 2008 ("Zhu") (SPR00000198-SPR00000211).
Abd-El-Malek et al., Ursa Minor: Versatile Cluster-Based Storage, 2005 ("Abd-El-Malek")(SPR00000212-SPR00000225).
Bobbarjung et al., Improving Duplicate Elimination in Storage Systems, 2006 ("Bobbarjung")(SPR00000226-SPR00000248).
Cox et al., Pastiche: Making Backup Cheap and Easy, 2002 ("Cox")(SPR00000249-SPR00000263).
Dabek et al., Wide-Area Cooperative Storage With CFS, 2001 ("Dabek")(SPR00000264-SPR00000277).
Debnath et al., ChunkStash: Speeding up Inline Storage Deduplication Using Flash Memory, 2010 ("Debnath") (SPR00000278-SPR00000292).
Fu et al., Fast and Secure Distributed Read-Only File System, 2000 ("Fu 2000")(SPR00000293-SPR00000308).
Fu et al., Fast and Secure Distributed Read-Only File System, 2002 ("Fu")(SPR00000309-SPR00000332).
Mesnier et al., Object-Based Storage, 2003 ("Mesnier")(SPR00000333-SPR00000339).
Muthitacharoen et al., Ivy: A Read/Write Peer-to-Peer File System, 2002 ("Muthitacharoen")(SPR00000340-SPR00000353).
USPTO PTAB Decision Denying Institution of Inter Partes Review entered Mar. 22, 2017, *Springpath, Inc.* v. *SimpliVity Corp.*, Case IPR2016-01780, U.S. Pat. No. 8,478,799 B2.
USPTO PTAB Patent Owner's Preliminary Response dated Dec. 27, 2016, *Springpath, Inc.* v. *SimpliVity Corp.*, Case IPR2016-01780, U.S. Pat. No. 8,478,799 B2 (SimpliVity Exhibits 2001-2009 identical to IPR2016-01779 and previously submitted).
Petition for Inter Partes Review of U.S. Pat. No. 8,478,799 before the USPTO Patent Trial and Appeal Board dated Sep. 14, 2016, Case IPR2016-01779.
Declaration of Darrell D.E.Long, Ph.D. Regarding U.S. Pat. No. 8,478,799 dated Sep. 14, 2016, Case IPR2016-01779 (Springpath Exhibit 1002).
US Patent and Trademark Office non-final Office Action dated Aug. 30, 2012 in U.S. Appl. No. 12/823,922 (Springpath Exhibits 1006 & 1106).
Response to USPTO non-final Office Action of Aug. 30, 2012 filed Dec. 18, 2012 in U.S. Appl. No. 12/823,922 (Springpath Exhibits 1009 & 1109).
US Patent and Trademark Office final Office Action dated Feb. 22, 2013 in U.S. Appl. No. 12/823,922 (Springpath Exhibits 1010 & 1110).
Response to USPTO final Office Action of Feb. 22, 2013 filed May 8, 2013 in U.S. Appl. No. 12/823,922 (Springpath Exhibits 1012 & 1112).
Best, et al., How the Journaled File System handles the on-disk layout, May 2000, IBM: developerWorks: Linux library/Open source library Internet download Apr. 18, 2001; http://swgiwas001.sby.ibm.com/developerworks/library/jfslayout/indexl.html (Springpath Exhibits 1011 & 1111).
US Patent and Trademark Office Notice of Allowance dated May 29, 2013 in U.S. Appl. No. 12/823,922 (Springpath Exhibits 1013 & 1113).
Petition for Inter Partes Review of U.S. Pat. No. 8,478,799 before the USPTO Patent Trial and Appeal Board dated Sep. 14, 2016, Case IPR2016-01780.
Declaration of Darrell D.E.Long, Ph.D. Regarding U.S. Pat. No. 8,478,799 dated Sep. 14, 2016, Case IPR2016-01780 (Springpath Exhibit 1102).
IEEE The Open Group, 1003.1TM Standard for Information Technology—Portable Operating System Interface (POSIX (R)) System Interfaces, Issue 6, IEEE Std 1003.1-2001, Approved Sep. 12, 2001 The Open Group (2 pp.) (Springpath Exhhibits 1014 & 1114).
IEEE The Open Group, 1003.1TM Standard for Information Technology—Portable Operating System Interface (POSIX (R)) Base Definitions, Issue 6, IEEE Std 1003.1-2001, Approved Sep. 12, 2001 The Open Group (8 pp.) (Springpath Exhibits1015 & 1115).
IBM, AIX 5L Version 5.2 General Programming Concepts: Writing and Debugging Programs, 2004 ("GPC") (SPR00000788-SPR00001403).
IBM, AIX 5L Version 5.2 System Management Concepts: Operating System and Devices, 2004 ("SMC") (SPR00001404-SPR00001593).
USPTO PTAB Decision Denying Institution of Inter Partes Review entered Mar. 22, 2017, *Springpath, Inc.* v. *SimpliVity Corp.*, Case IPR2016-01779, U.S. Pat. No. 8,478,799 B2.
USPTO PTAB Patent Owner's Preliminary Response dated Dec. 27, 2016, *Springpath, Inc.* v. *SimpliVity Corp.*, Case IPR2016-01779, U.S. Pat. No. 8,478,799 B2 (SimpliVity Exhibits 2001-2009 listed below).
Wikipedia: "Object Storage" (available at https://en.wikipedia.org/wiki/Object_storage) (last visited Dec. 6, 2016), SimpliVity Exhibit 2001, *Springpath* v. *SimpliVity* IPR2016-01779.
Webopedia: "Inode" (available at http://www.webopedia.com/TERM/I/inode.html) (last visited Dec. 20, 2016), SimpliVity Exhibit 2002, *Springpath* v. *SimpliVity* IPR2016-01779.

(56) References Cited

OTHER PUBLICATIONS

Presentation: "Object Storage technology," Storage Networking Industry Association, 2013 (available at http://www.snia.org/sites/default/education/tutorials/2013/spring/file/BrentWelch_Object_Storage_Technology.pdf) (last visited Dec. 22, 2016), SimpliVity Exhibit 2003, *Springpath* v. *SimpliVity* IPR2016-01779.
"Object Storage versus Block Storage: Understanding the Technology Differences," Aug. 14, 2014 (available at http://www.druva.com/blog/object-storage-versus-block-storage-understanding-technology-differences/) (last visited Dec. 22, 2016), SimpliVity Exhibit 2004, *Springpath* v. *SimpliVity* IPR2016-01779.
"Understanding Object Storage and Block Storage use cases," Jul. 20, 2015 (available at http://cloudacademy.com/blog/object-storage-block-storage/) (last visited Dec. 22, 2016), SimpliVity Exhibit 2005, *Springpath* v. *SimpliVity* IPR2016-01779.
"OBFS: A File System for Object-based Storage Devices." Feng, et al., 2004, SimpliVity Exhibit 2006, *Springpath* v. *SimpliVity* IPR2016-01779.
"Oasis: An active storage framework for object storage platform," Xie, et al., 2015, SimpliVity Exhibit 2007, *Springpath* v. *SimpliVity* IPR2016-01779.
Wikipedia: "Namespace" (available at https://en.wikipedia.org/wiki/Namespace) (last visited Dec. 6, 2016), SimpliVity Exhibit 2008, *Springpath* v. *SimpliVity* IPR2016-01779.
Weopedia: "Namespace" (available at http://www.webopedia.com/TERM/N/namespace.html) (last visited Dec. 20, 2016), SimpliVity Exhibit 2009, *Springpath* v. *SimpliVity* IPR2016-01779.
Rhea et al., Fast, Inexpensive Content-Addressed Storage in Foundation, 2008 ("Rhea")(SPR00000354-SPR00000367).
Richie et al., The UNIX Time-Sharing System, 1974 ("Richie")(SPR00000368-SPR00000378).
Levanoni et al., An On-the-Fly Reference-Counting Garbage Collector for Java, 2001 ("Levanoni")(SPR00000379-SPR00000445).
Boehm et al., Garbage Collection in an Uncooperative Environment, 1998 ("Boehm")(SPR00000446-SPR00000462).
1003.1™ Standard for Information Technology—Portable Operating System Interface (POSIX®), System Interfaces, Issue 6, 2001 ("POSIX_SI_2001")(SPR00000463-SPR00000464).
Harel Paz, Efficient Memory Management for Servers, 2006 ("Paz")(SPR00000465-SPR00000692).
Grembowski et al., Comparative Analysis of the Hardware Implementations of Hash Functions SHA-1 and SHA-512, 2002 ("Grembowski")(SPR00000693-SPR00000707).
Chaves et al., Cost-Efficient SHA Hardware Accelerators, 2008 ("Chaves")(SPR00000708-SPR00000717).
Hitz et al., File System Design for an NFS File Server Appliance, 1994 ("Hitz")(SPR00000718-SPR00000740).
Kawaguchi et al., A Flash-Memory Based File System, 1995 ("Kawaguchi")(SPR00000741-SPR00000750).
You et al., Deep Store: An Archival Storage System Architecture, 2005 ("You")(SPR00000751-SPR00000762).
McKusick et al., A fast file system for UNIX, 1984 ("McKusick")(SPR00000763-SPR00000779).
The EMC Centera and TOWER Technology Advantage, 2002 ("Centera")(SPR00000780-SPR00000787).
Hutchinson et al., Logical vs. Physical File System Backup, 1999 ("Hutchinson")(SPR00001594-1605).
Prashant Shenoy, "Declaration of Prashant Shenoy, PhD, Under 37 C.F.R. § 1.68 in Support of Petition for Inter Partes Review of U.S. Pat. No. 8,478,799", dated Aug. 11, 2017, 196 pages.
"Curriculum Vitae of Dr. Prashant Shenoy", 2017, 31 pages.
Athicha Muthitacharoen, et al., "Ivy: A Read/Write Peer-to-Peer File System," Proceedings of the 5th Symposium on Operating Systems Design and Implementation (OSDI '02), Operating Systems Review, vol. 36, Issue SI (Winter 2002), 21 pages.
Frank Dabek, et al., "Wide-area cooperative storage with CFS," Proceedings of the 18th ACM Symposium on Operating Systems Principles (SOSP'01), Operating Systems Review, vol. 35, No. 5 (Dec. 2001), pp. 1-19.

Nitin Agrawal, et al., "Design Tradeoffs for SSD Performance," USENIX'08: 2008 USENIX Annual Technical Conference, Jun. 25, 2008, pp. 57-70.
Marshall Kirk McKusick, et al., "The Design and Implementation of the FreeBSD Operating System", FreeBSD version 5.2, CSCO-1011, (2005), pp. 1-43.
Josh Cates, "Robust and Efficient Data Management for a Distributed Hash Table", Jun. 2003, 64 pages.
Marice J. Bach, The Design of the UNIX Operating System (1986), 8 pages.
Prashant Shenoy, et al., "Symphony: An Integrated Multimedia File System," Proceedings of SPIE 3310, Multimedia Computing and Networking 1998, pp. 124-138.
Garth Gibson, et al., "A Cost-Effective, High-Bandwidth Storage Architecture," Proceedings of the 8th Conference on Architectural Support for Programming Languages and Operating Systems, 1998, pp. 92-103.
Mike Mesnier, et al., "Object-Based Storage," IEEE Communication Magazine, Aug. 2003, pp. 84-90.
R. Rivest, "The MD5 Message-Digest Algorithm," Request for Comments 1321, Internet Engineering Task Force, CSCO-1017, Apr. 1992, 21 pages.
Bruce Eckel, "C++ Inside & Out", 1992, 6 pages.
Mendel Rosenblum, "The Design and Implementation of a Log Logstructuredfile System", Kluwer Academic Publishers, 1995, 3 pages.
Webster's New World Computer Dictionary, 10th Ed. 2003, 3 pages.
Microsoft Computer Dictionary, 5th Ed., 2002, 7 pages.
"AMD Athlon Processor", ADM Technical Brief, Publication # 22054, Rev. D, Issue date Dec. 1999, 10 pages.
Stevens, et al., "The first collision for full SHA-1," International Association for Cryptology Research 2017, pp. 570-596.
Andrew S. Tanenbaum, "Modern Operating Systems", 2d Ed., 2001, 7 pages.
Alan Freedman, "Computer Desktop Encyclopedia 9th Ed", Osborne/McGraw-Hill, 2001, 7 pages.
Sang-Won Lee, et al., "A Case for Flash Memory SSD in Enterprise Database Applications," Proceedings of the 2008 ACM SIGMOD International Conference on Management of Data, Jun. 9-12, 2008, pp. 1075-1086.
Bruce Schneier, "Applied Cryptography, 2d Ed, Protocol, Algorithms, and Source Code in C", John Wiley & Sons, Inc., 1996, 4 pages.
Martin Placek, "Storage Exchange: A Global Platform for Trading Distributed Storage Services," Master of Engineering Science Thesis, The University of Melbourne, Australia, Jul. 2006, 185 pages.
Ragib Hasan, et al., "A Survey of Peer-to-Peer Storage Techniques for Distributed File Systems," International Conference on Information Technology: Coding and Computing, 2005, 9 pages.
"Preliminary Information, AMD Athlon, Processor Module Data Sheet", AMD Athlon, Publication #21016, Rev. M, Issue Date:Jun. 2000, 74 pages.
AMD Athlon™, "Processor Quick Reference FAQ", Feb. 3, 2000, 12 pages.
"MARC Record Information for Operating Systems Review"—Proceedings of the Fifth ACM Symposium on Operating Systems Design and Implementation (OSDI'02), available at the WRLC online catalog, accessed Jul. 20, 2017, 3 pages.
"Bibliographic Record Information for Operating Systems Review"—Proceedings of the Fifth ACM Symposium on Operating Systems Design and Implementation (OSDI'02), Dec. 9-11, 2002, available at the WRLC online catalog, accessed Jul. 20, 2017, 2 pages.
"MARC Record Information for Operating Systems Review"—Proceedings of the 18th ACM Symposium on Operating Systems Principles (SOSP'01), 2001, available at the online catalog of the Library of Congress, accessed Jul. 31, 2017, 3 pages.
"Bibliographic Record Information for Operating Systems Review"—Proceedings of the 18th ACM Symposium on Operating Systems Principles (SOSP'01), 2001, available at the online catalog of the Library of Congress, accessed Jul. 31, 2017, 3 pages.

(56) References Cited

OTHER PUBLICATIONS

"Operating Systems Review"—Proceedings of the 18th ACM Symposium on Operating Systems Principles (SOSP'01), vol. 35, No. 5, pp. 202-215, Oct. 21-24, 2001, obtained from a CD-ROM from Auburn University, 11 pages.
"MARC Record Information for Operating Systems Review"—Proceedings of the 18th ACM Symposium on Operating Systems Principles (SOSP'01), Oct. 21-24, 2001, CD-ROM, available at the Auburn University Library online catalog, accessed Jul. 28, 2017, 1 page.
"Bibliographic Record Information for Operating Systems Review"—Proceedings of the 18th ACM Symposium on Operating Systems Principles (SOSP'01) CD-ROM, Oct. 21-24, 2001, available at the Auburn University Library online catalog, accessed Jul. 28, 2017, 1 pages.
"Scan of CD-ROM and CD-ROM Case, Operating Systems Review"—Proceedings of the 18th ACM Symposium on Operating Systems Principles (SOSP'01), Oct. 21-24, 2001, CD-ROM obtained from the Auburn University Library, 1 page.
Byung-Gon Chun, et al., "Efficient Replica Maintenance for Distributed Storage Systems," USENIX Association, Proceedings of NSDI '06: 3rd Symposium on Networked Systems Design & Implementation, 2006, pp. 45-58.
Dabek., F., et al., "Wide-area cooperative storage with CFS," Operating Systems Review—Proceedings of the 18th ACM Symposium on Operating Systems Principles (SOSP'01), vol. 35, No. 5, 2001, pp. 202-215.
Ingrid Hsieh-Yee, "Declaration of Ingrid Hsieh-Yee, PhD, Under 37 C.F.R. § 1.68 in Support of Petition for Inter Partes Review of U.S. Pat. No. 8,478,799", dated Aug. 10, 2017, 77 pages.
Michele Nelson, "Declaration of Michele Nelson, Under C.F.R. § 1.68", dated Aug. 9, 2017, 92 pages.
David Bader, "Declaration of David Bader, Under 37 C.F.R. § 1.68", dated Aug. 10, 2017, 31 pages.
MARC Record Information,"The Design and Implementation of the FreeBSD Operating System", 2005, 2 pages, available at the online catalog of the Library of Congress, accessed Aug. 3, 2017.
Bibliographic Record Information, "The Design and Implementation of the FreeBSD Operating System", 2005, 2 pages, available at the online catalog of the Library of Congress, accessed Aug. 3, 2017.
Marshall Kirk McKusick, et al., "The Design and Implementation of the FreeBSD Operating System", FreeBSD version 5.2, 2005, 32 pages, obtained from the George Mason University Library.
MARC Record Information, "The Design and Implementation of the FreeBSD Operating System" 2005, 2 pages, available at the online catalog of the George Mason University Library, accessed Aug. 3, 2017.
Bibliographic Record Information for "The Design and Implementation of the FreeBSD Operating System", 2005, 2 pages, available at the online catalog of the George Mason University Library, accessed Aug. 3, 2017.

Decision Denying Institution of Inter Partes Review, Case IPR2017-01933, U.S. Pat. No. 8,478,799 B2, Mar. 16, 2018, pp. 1-18, USPTO.
Defendant Springpath, Inc.'s Motion for Leave to File Supplemental Claim Construction Brief, Case 4:15-cv-13345-TSH, Document 146, Oct. 17, 2017, pp. 1-5.
Defendant Springpath, Inc.'s Preliminary Claim Construction Brief with Exhibits, Case 4:15-cv-13345-TSH, Document 129, Jul. 10, 2017, pp. 1-138.
Defendant Springpath, Inc.'s Reply Claim Construction Brief, Case 4:15-cv-13345-TSH, Document 133, Jul. 24, 2017, pp. 1-17.
Frank Dabek, "A Distributed Hash Table," Sep. 2005, pp. 1-135, Massachusetts Institute of Technology.
Hewlett Packard Enterprise Company's Response to Springpath's Supplemental Claim Construction Brief, C.A. No. 4:15-cv-13345-TSH, Oct. 30, 2017, pp. 1-5.
Joint Claim Construction and Prehearing Statement, Case 4:15-cv-13345-TSH, Document 136, Aug. 7, 2017, pp. 1-8.
Patent Owner's Preliminary Response Pursuant to 37 CFR 42.107(a), Case IPR2017-01933, U.S. Pat. No. 8,478,799, Dec. 21, 2017, pp. 1-47.
Petitioner's Reply to Patent Owner's Preliminary Response, Case IPR2017-01933, U.S. Pat. No. 8,478,799, Feb. 28, 2018, pp. 1-17.
SimpliVity Corporation's Markman Hearing Transcript, Case No. 15cv13345-TSH, Aug. 16, 2017, pp. 1-119.
Simplivity Corporation's Opening Claim Construction Brief, Case 4:15-cv-13345-TSH, Document 130, Jul. 10, 2017, pp. 1-21.
Simplivity Corporation's Reply Claim Construction Brief, Case 4:15-cv-13345-TSH, Document 132, Jul. 24, 2017, pp. 1-23.
USENIX Association, "Proceedings of the First Symposium on Networked Systems Design and Implementation," Mar. 2004, pp. 1-15, San Francisco, CA, USA.
Li, et al., Secure Untrusted Data Repository (SUNDR), OSDI '04: 6th Symposium on Operating Systems Design and Implementation, pp. 122-136, USENIX Association (Springpath Exhibits 1003 & 1103), Mar. 22, 2017.
Sandberg, et. al, Design and Implementation of the Sun Network Filesystem, Sun Microsystems, Mountain View, CA (12 pp) (Springpath Exhibits 1004 & 1116) Dec. 27, 2016.
Sean Quinlan, et al., "Venti: a new approach to archival storage," Proceedings of Fast 2002 Conference of File and Storage Technologies, Jan. 28-30, 2002, pp. 1-14.
U.S. Appl. No. 61/269,633 filed by Arthur J. Beaverson entitled "File system", on Jun. 26, 2009, 32 pages.
Prosecution History of the U.S. Pat. No. 8,478,799 assigned to SimpliVity Corporation issued on Jul. 2, 2013, 576 pages.
Cisco Inc.'s (Petitioner) Petition for Inter Partes Review of U.S. Pat. No. 8,478,799 filed before the Patent Trail and Appeal Board of USPTO on Aug. 11, 2017 in case IPR2017-01933, 92 pages.
"Frequently Asked Questions for FreeBSD 2.X, 3.X and 4.X", The FreeBSD Documentation Project, 1995, available online at <https://webarchive.org/web/20060106081446/http://freebsd.org:80/doc/en_us.ISO8859-1/books/faq/install.html>, Jul. 8, 2001, 11 pages.

* cited by examiner

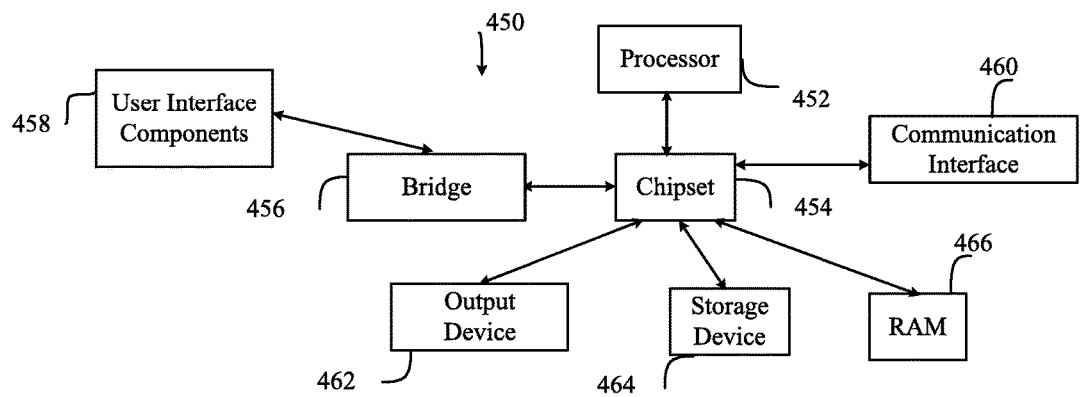
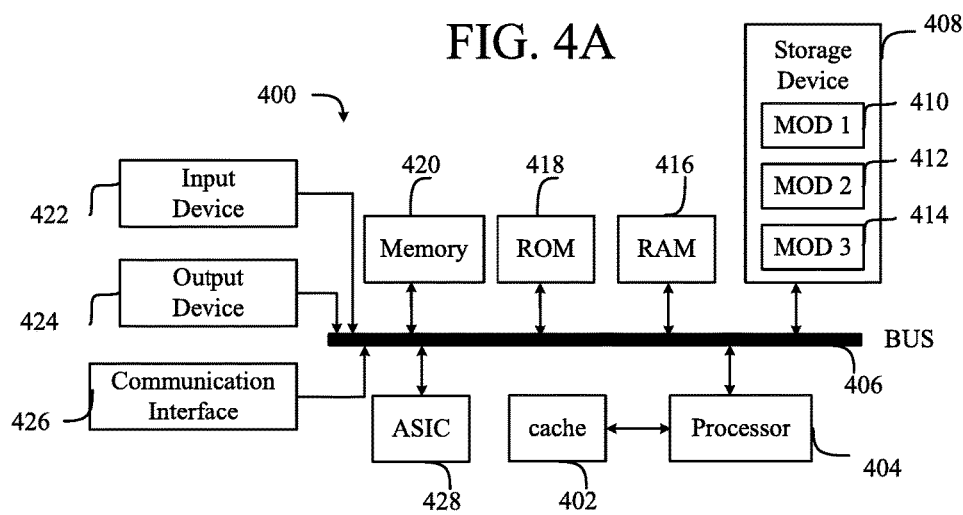

MULTI-PLATFORM INSTALLER

TECHNICAL FIELD

The present technology pertains to software installation packages, and more specifically, the present technology involves a multi-platform installer for installing software applications on different computing platforms.

BACKGROUND

Today's data centers can be very complex, generally running numerous different platforms, virtual environments, hardware and software solutions, etc. The lack of uniformity in the data center can pose significant challenges when integrating, installing, and configuring compute resources in the data center. For example, software packages and installers are often specific to a particular platform or environment. Thus, different software packages and installers may be necessary to support the various platforms and environments in the data center. Moreover, configuration settings and requirements in the data center may vary by solution, platform, or environment. This can limit the interoperability of resources in the data center and greatly complicate the integration and implementation of different resources in the data center. Unfortunately, current solutions lack multi-platform support, and thus fail to provide a flexible and efficient solution to the challenges posed by the lack of uniformity within data centers.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4A and FIG. 4B illustrate example system embodiments.

DESCRIPTION OF EXAMPLE EMBODIMENTS

Figure 1:
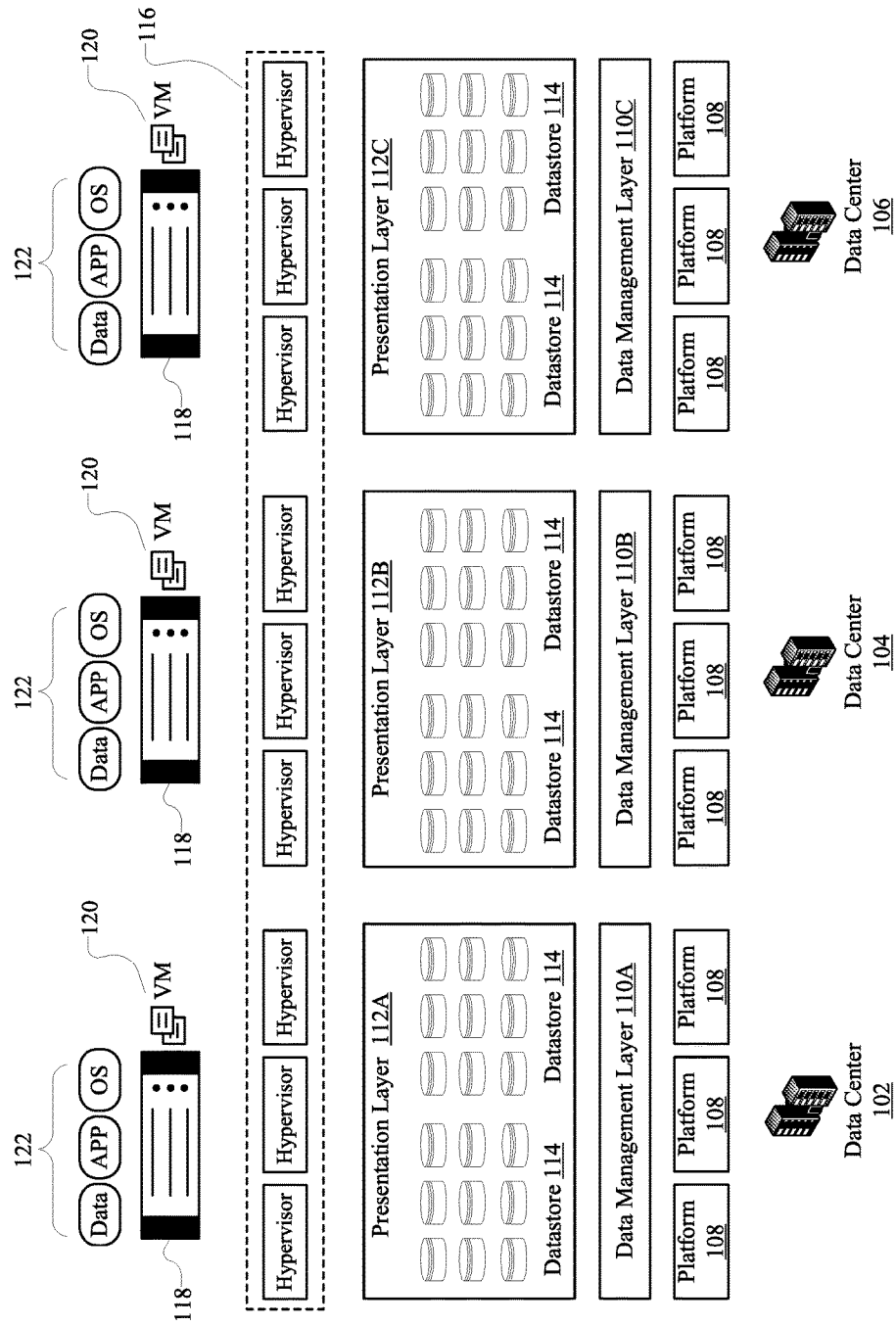
FIG. 1 illustrates a schematic diagram of an example data virtualization platform.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can provide a fully-automated manufacturing installation and configuration system for servers and computing devices in a network, such as a data center. Moreover, the approaches set forth herein can create a scalable, customizable, and deterministic integration and verification system for different platforms and virtualization environments. For example, the approaches herein can provide a secure, bootable software device that supports field upgrades, including patches and firmware updates, in multiple platforms and/or environments.

The installation and system configuration for servers and computing devices in the network can be performed through a multi-platform software tool as described herein. The software tool can also provide the ability for field upgrades at partner sites. This feature can enable partners to get product upgrades with minimum disruption and provide a simple way for integration partners to load the correct images and correct system settings onto the system.

Disclosed are systems, methods, and computer-readable storage media for multi-platform software packages and installers. In some examples, a system can launch a software package configured to perform a software installation on the system. The software package can be a multi-platform package configured to perform integration, installation, or updating of software and/or settings on the system. For example, the software package can be agnostic to the platform, environment, resources, and/or configuration of the system to allow the software package to operate and/or adapt to different types of platforms, environments and/or resources.

The software package can detect an underlying computing environment associated with the system. The underlying computing environment can include a type of system, software characteristics, hardware characteristics, and/or any other characteristics or parameters. For example, the underlying computing environment can include the type of platform, the type of virtual environment, a manufacturer identifier, a system model, a system configuration, system drivers, firmware version, system libraries, system hardware and/or software resources, etc.

Based on the detected underlying computing environment, the software package can select one or more settings for a configuration update on the system. The one or more settings can define, for example, network configuration parameters, system firmware parameters, drive configuration parameters, system boot drive configuration parameters, performance parameters, security parameters, etc. Based on the one or more settings, the software package can execute the configuration update on the system. The configuration update can include creating or modifying software or hardware resources, such as physical disk configuration, memory configuration, operating system configuration parameters, virtual resources, network resources, etc.

Based on the configuration update, the software package can install a software application on the system. The software application can be installed and/or configured on the system based on the configuration update, the one or more settings, the underlying environment, user preferences, system preferences, etc. If the software application requires any specific settings, resources, dependencies, or other requirements to install or run on the system, such details can be implemented on the system by the configuration update. Thus, the software package, through the configuration update, can automate the preparation, configuration, and installation of the software application for various underlying environments, including various types of platforms, virtualized environments, and/or configuration settings.

Description

Figure 2:
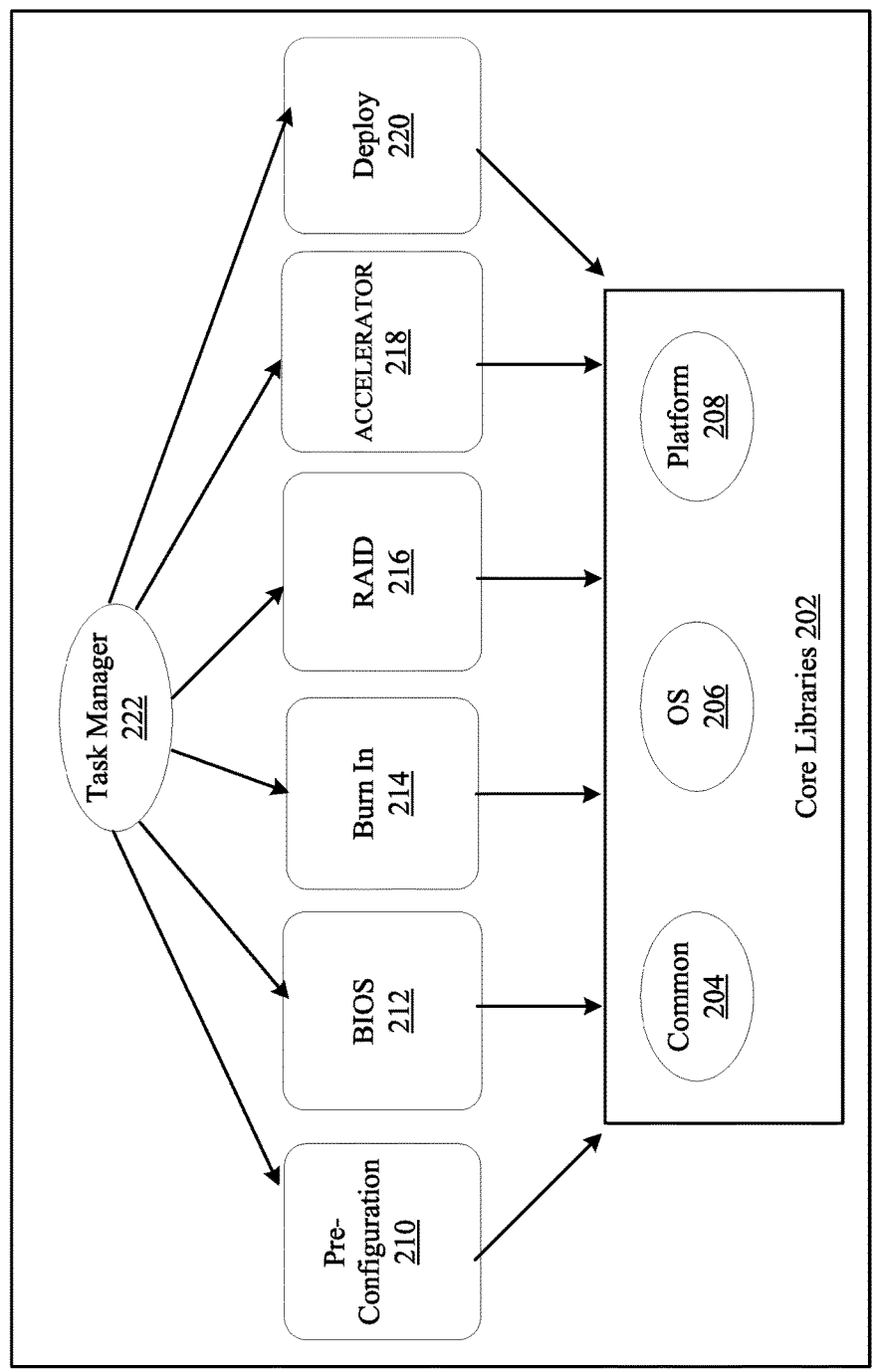
FIG. 2 illustrates a schematic diagram of an example architecture for a multi-platform software installation tool.

The disclosed technology addresses the need in the art for multi-platform installers. The present technology involves system, methods, and computer-readable media for scalable, customizable, and deterministic multi-platform software installers. An introductory description of multi-platform software installers, followed by a description of systems, architectures and environments for multi-platform software installers, as illustrated in FIGS. 1 and 2, is first disclosed herein. A discussion of multi-platform installers, as illustrated in FIG. 3, will then follow. The discussion concludes with a brief description of example computing devices, as illustrated in FIGS. 4A-B. These variations shall be described herein as the various embodiments are set forth.

The disclosure first turns to an introductory discussion of a multi-platform software installation tool. A multi-platform software installation tool can be generated for integrating and inspecting server hardware, server firmware, and other system components and infrastructure, such as a virtualized appliance, for example.

The software tool can provide software installation, configuration, and integration functionalities. Moreover, the software tool can include an integration component and an inspection component. The integration component can automate the integration process, which can include integrating a server to use specific software, such as virtualization software or a hyper converged infrastructure, for example.

Integrating a server to use specific software can involve ensuring the qualified version of server firmware, accelerator firmware, disk (e.g., RAID) controller firmware, disk (e.g., RAID) configuration, and server configuration are completed or implemented. Each platform may require a manufacturing integration manual, and the software tool can automate each of the details listed in the supported platform's integration manual. Integrations may be supported by various platforms, such as PXE. For example, the software tool can be designed to be bootable via a memory device (e.g., USB Flash memory device) or a PXE (Preboot Execution Environment) server.

In some cases, an integration process may be started more than once to complete an integration. When this occurs, log files for the integrations can be stored in memory, such as on a USB memory device. Moreover, the integration process may be monitored in various ways, such as by a web interface or a console.

As previously mentioned, the software tool can also perform an inspection of the integration process. Each server that executes the specific software deployed via the software tool may pass an inspection, which may verify firmware versions, disk settings such as RAID settings, server settings, software settings, network settings, etc. The software tool can automate the verification of each of the various components and generate a build state report.

Inspections can be supported by a specific platform, such as a USB platform. The inspection process can generate the build data, which can be stored on the specific platform, such as the USB platform. The build state data can be uploaded by a user for further inspection. One or more sets of build state data per serial number can be saved on the inspection component (e.g., USB). However, in some cases, only one set of build state data may be saved for a serial number. In this example, should the inspection run multiple times for the same serial number, the contents from the previous inspections can be destroyed.

Field upgrades can include co-exist or rewrite upgrades. Co-exist upgrades are patches provided that the software tool can extract and apply with an existing image. Co-exist upgrades can be used for small fixes to the software framework or infrastructure, or other system components. Coexist upgrade rewrites can be implemented as an installer file, such as an RPM file, that contains a script and data that contains the updates.

A re-write upgrade can be used for large upgrades or major releases. A re-write may require that the system be able to replace an entire image and/or repartition boot media to support new features or resolve system inconsistencies.

The software tool can perform operations to discover the type of server, configuration, and/or components of the system. Moreover, the software tool can be based on a data driven architecture. Different platforms may contain a respective configuration file (e.g., an XML configuration file) that determines the model type of the system.

When the software tool executes an integration or inspection, it can determine the server type of the system. At the lowest level, the first step in identifying the server type can be to find the vendor name. The vendor name can be found by parsing the output of the 'dmidecode—s system-manufacturer' command and parsing the results currently looking for specific vendors, such as "VendorName1", "VendorName2" or "VendorName3". If the value returned is not associated with any specific or known manufacturer or vendor, then execution may fail.

Below is an example function for determining a server type:

```
$vendor = 'dmidecode -s system-manufacturer'
if $vendor = 'VendorName1'
$SERVER_TYPE = Vendor1
else if $vendor = 'VendorName2'
$SERVER_TYPE = Vendor2
$SERVER_NAME = 'dmidecode -s system-product-name'
else if $vendor = 'VendorName3'
$SERVER_TYPE = Vendor3
// ADD ANY NEW VENDOR HERE
else
error 'UNKNOWN VENDOR'
```

After the server type is determined, the system configuration can be determined. The system configuration can include a hardware inventory of disk adapter(s) such as RAID adapters, number of physical disks and their sizes, number of SSDs (solid state drives) and their sizes, amount of memory on the server, and other details. Using the platform details, physical disk count, physical disk size, SSD count and SSD size, the model type can be determined, such as small, medium or large.

The configuration of the HDDs, SDDs, respective sizes can be found using vendor specific commands through an interface, such as a BMC (Baseboard Management Controller) interface.

For Vendor1 platforms, the IMC command 'chassis/hdd-pid detail' output can be parsed to find the number of HDDs, SSDs and their sizes.

For Vendor2 platforms, the number of HDDs, SSDs, their sizes, and the number of CPUs can be determined by using OS commands, such as:

```
hdd_count = parse output of 'MegaCli64 -adpallinfo -a0,1'
hdd_size = parse output of 'MegaCli64 -adpallinfo -a0,1'
ssd_count = parse output of 'MegaCli64 -adpallinfo -a0,1'
ssd_size = parse output of 'MegaCli64 -adpallinfo -a0,1'
cpus = parse output of 'dmidecode -s processor-version'
```

Additionally, for some Vendor2 servers, two motherboard chipsets may be supported, such as Haswell and Broadwell. The chipset type can be determined at the same time as the vendor name as shown in the pseudocode above.

The table below provides example details for different platforms or models:

| Model | CPU | SSD Count | SSD Size | HDD Count | HDD Size |
|---|---|---|---|---|---|
| Vendor1 Small | — | 2 | 480 GB | 8 | 1 TB |
| Vendor1 Medium | — | 4 | 480 GB | 20 | 1 TB |
| Vendor1 Large | — | 4 | 480 GB | 20 | 1.2 TB |
| Vendor2 HASWELL Small | — | 2 | 480 GB | 8 | 1 TB |
| Vendor2 HASWELL Medium | — | 4 | 480 GB | 20 | 1 TB |
| Vendor2 HASWELL Large | — | 4 | 480 GB | 20 | 1.2 TB |
| Vendor2 BROADWELL Small | — | 2 | 480 GB | 8 | 1.2 TB |
| Vendor2 BROADWELL Medium | — | 4 | 480 GB | 20 | 1 TB |
| Vendor2 BROADWELL Large | — | 4 | 480 GB | 20 | 1.2 TB |

Once the model is determined, one or more of the following tasks can run for all models:
  Preconfigure;
  Management network configuration;
  Hardware burn in test;
  Server firmware update;
  Server BIOS settings;
  RAID configuration;
  Server Boot drive configuration;
  Software setup; and
  Inspection.

The software tool can use the server model to determine the RAID virtual disk sizes. Because the server model can be defined by parameters including disk count and disk size, the RAID virtual drive configuration can be different for each model. The actual virtual drive sizes can be contained in the software.

Virtual Drives can be created using commands (e.g., MegaCli64) for making virtual drives and virtual spans using the server RAID controller. RAID controller attributes can be the same for all models.

The model type can dictate the details for configuring the RAID virtual devices for each individual platform. Some details are provided in the table below:

| Model | RAID | Disks | Size | Stripe | Attributes |
|---|---|---|---|---|---|
| Vendor1 Small | 1 | 1-2 | 102400 MB | 64K | WB, RA |
|  | 1 | 1-2 | Remainder | 64K | WB, RA |
|  | 6 | 3-10 | 5.445 TB | 64K | WB, RA |
| Vendor1 Medium | 5 | 1-4 | 100 GB | 64K | WB, RA |
|  | 5 | 1-4 | Remainder | 64K | WB, RA |
|  | 60 | 5-24 | 14.546 TB | 64K | WB, RA |
| Vendor1 Large | 5 | 1-4 | 102401 MB | 64K | WB, RA |
|  | 5 | 1-4 | Remainder | 64K | WB, RA |
|  | 60 | 5-24 | 17.457 TB | 64K | WB, RA |
| Vendor2 HASWELL Small | 1 | 0-1 | 102400 MB | 64K | WB, RA |
|  | 1 | 0-1 | Remainder | 64K | WB, RA |
|  | 6 | 2-9 | 5.455 TB | 64K | WB, RA |
|  | 1 | 2-3 | 278.875 GB | 64K | WB, RA |
| Vendor2 HASWELL Medium | 5 | 0-3 | 102401 MB | 64K | WB, RA, Cached |
|  | 5 | 0-3 | Remainder | 64K | WB, RA, Cached |
|  | 60 | 4-23 | 14.546 TB | 64K | WB, RA, Cached |
|  | 1 | 1-3 | 278.875 GB | 64K | WT, NORA, Cached |
| Vendor2 HASWELL Large | 5 | 0-3 | 102401 MB | 64K | WB, RA, Cached |
|  | 5 | 0-3 | Remainder | 64K | WB, RA, Cached |
|  | 60 | 4-23 | 17.457 TB | 64K | WB, RA, Cached |
|  | 1 | 1-3 | 278.875 GB | 64K | WB, NORA, Cached |
| Vendor2 BROADWELL Small | 1 | 0-1 | 102400 MB | 64K | WB, RA, Cached |
|  | 1 | 0-1 | Remainder | 64K | WB, RA, Cached |
|  | 6 | 2-9 | 6.455 TB | 64K | WB, RA, Cached |
|  | 1 | 16-17 | 278.875 GB | 64K | WT, NORA, Cached |
| Vendor2 BROADWELL Medium | 5 | 0-3 | 102401 MB | 64K | WB, RA, Cached |
|  | 5 | 0-3 | Remainder | 64K | WB, RA, Cached |
|  | 1 | 1-3 | 278.875 GB | 64K | WT, NORA, Cached |
| Vendor2 BROADWELL Medium | 5 | 0-3 | 102401 MB | 64K | WB, RA, Cached |
|  | 5 | 0-3 | Remainder | 64K | WB, RA, Cached |
|  | 60 | 4-23 | 17.457 TB | 64K | WB, WB, RA, Cached |
|  | 1 | 1-3 | 278.875 | 64K | WT, NORA, Cached |
| Vendor3 | 1 | 2 | 278.875 GB | 64K | WT, NORA |
|  | 1 | 2 | 100 GB | 64K | RA, WB, |
|  | 1 | 2 | Remainder | 64K | RA, WB, |
|  | 5 | 4 | 2793 GB | 64K | RA, WB, Cache Disabled |
| Vendor3 Small | 1 | 2 | 278.875 GB | 64K | WT, NORA, |
|  | 1 | 2 | 100 GB | 64K | RA, WB, |
|  | 1 | 2 | Remainder | 64K | RA, WB, |
|  | 6 | 8 | 5586 GB | 64K | RA, WB, Cache Disabled |
| Vendor3 Medium | 1 | 2 | 278.875 GB | 64K | WT, NORA, |
|  | 5 | 4 | 100 GB | 64K | RA, WB, |
|  | 5 | 4 | Remainder | 64K | RA, WB, |
|  | 60 | 20 | 14896 GB | 64K | RA, WB, Cache Disabled |
| Vendor3 Large | 1 | 2 | 278.875 GB | 64K | WT, NORA, |
|  | 5 | 4 | 100 GB | 64K | RA, WB, |
|  | 5 | 4 | Remainder | 64K | RA, WB, |
|  | 60 | 20 | 17876 GB | 64K | RA, WB, Cache Disabled |

In addition to the virtual device settings, the model can be used to verify CPU, NIC, PSUs and configuration settings. The model specific settings can be contained in the configuration files.

The model and configuration files can be read again and used to verify that the server is correctly configured. After the inspection is successfully executed, a build state report, including model, serial number, firmware versions and other respective server attributes, can be created and written into a JSON or XML file for upload to and input to a database for accounting and technical support.

The firmware versions can be determined by using each respective vendor's board management controller interface, which can be abstracted using an SmcPlatform interface. Firmware versions can be read from the server platform and compared with the expected version contained in the configuration file. If the version on the platform is not consistent with the expected version, then the vendor firmware program tool can be launched with the required version updating the firmware to the version required to run the software associated with the software tool.

The configuration file can contain the relevant firmware settings for every platform in the respective <firmware> section of the configuration files. An example process for a firmware update is further described below with respect to FIG. 3B.

Having provided an introductory discussion of a software installation tool, the disclosure now turns to FIG. 1, which illustrates a schematic diagram of an example data virtualization platform 100 in accordance with the present technologies.

The data virtualization platform 100 can extend across data centers 102-106 which can abstract virtual data (e.g., VM data) from the underlying hardware. The data virtualization platform 100 can perform various functions, such as data deduplication, data compression, data optimization, data backup, data restore, data cloning, data management, etc.

The data centers 102-106 can support or be based on one or more specific platforms 108, such as x86 or x64 architectures, for example. Moreover, the data virtualization platform 100 can include data management layers 110A-C associated with the data centers 102-106. The data management layers 110A-C can track and store data and metadata associated with the data virtualization platform 100. In some cases, the data management layers 110A-C can include a file system sub-layer and an object store sub-layer (not shown), which can work together to track and manage data. The management layers 110A-C can track metadata objects which can help create logical copies of VMs to create clones or backups.

The data virtualization platform 100 can also include presentation layers 112A-C. The presentation layers 112A-C can create and present datastores 114 to the hypervisor layer 116, and map datastore objects to the respective data management layers 110A-C. The presentation layers 112A-C can support different types of hypervisors in the hypervisor layer 116 (e.g., VMWARE VSPHERE, CITRIX XENSERVER, MS HYPER-V, etc.).

The hypervisor layer 116 can include one or more hypervisors for creating and running VMs 120 in the data virtualization platform 100. The VMs 120 can be hosted on servers 118. Moreover, the VMs 120 and/or servers 118 can host different resources 122, such as data, application resources, operating systems, etc.

FIG. 2 illustrates a schematic diagram of an example architecture 200 for a multi-platform installer. The architecture 200 can include core libraries 202, task modules 210-220 and a task manager 222.

Task Manager 222

The task manager 222 can manage and execute various tasks in the architecture 200. The task manager 222 can be instantiated via a software module, such as a PERL module. Once the task manager 222 is instantiated, one or more tasks can be added to the task manager 222, which the task manager 222 can then execute. In some cases, the task manager 222 can execute tasks synchronously.

In some examples, the task manger 222 can include a PERL module. A Perl module feature::TaskManager, lib/feature/TaskManager.pm, can contain the task manager implementation. The task manager 222 can be instantiated by a call calling a new member function, such as: my $taskmgr=feature::TaskManager->new($info_log, $status_log, $retry).

Once the task manager 222 is created, tasks can be added to a task queue by calling a function, such as an add_task member function.

```
$taskmgr->add_task($name, $module, $retries[, start function]);
```

Each PERL module that implements a task can contain the following functions:

```
smc_start($self);
do_reboot($self);
post_reboot($self).
```

The add_task can contain an optional fourth parameter that contains the name of the start function to be used if the start function is not named smc_start.

After all the tasks are added, the task manager 222 can begin execution of the tasks by calling with a hash table filled with integration specific info containing for example:

```
    smc_version
    sn - serial number of the server
    model -server model number
    accelerator_sn - serial number of an accelerator card
    accelerator_fw - firmware version of the accelerator
    sw - version of the software
    integrator - integrator name
    $taskmgr->start($integinfo); # begin execution of the task list
```

Tasks 210-220

Non-limiting examples of tasks 210-220 can include pre-configuration 210, BIOS configuration 212, burn in test 214, RAID (redundant array of independent disks) configuration 216, accelerator 218, and deployment 220.

Core Libraries 202

The core libraries 202 can include a common library 204, an OS library (e.g., LINUX library), and a platform library 208.

Common Library 204

The common library 204 can include software modules, such as PERL modules, and may contain generic features across all platforms and systems. Example features can include, without limitation, constants, logging, utilities, etc. The common library 204 can also include modules for issuing local commands and/or remote commands.

Local Commands

A SubProcess module, such as lib/common/SubProcess.pm, can be used to issue local synchronous commands and/or issue interactive commands to the system being integrated. The public interface to issue synchronous commands can include:

```
my $result = common::SubProcess::run_cmd(command);
my $result = common::SubProcess::run_cmd(command, input);
my $result = common::SubProcess::sys_cmd(command, verbose);
```

The return result for each of these commands can be the output for the command that has been run. A value of FAIL or undefined can denote an error.

Interactive commands can be managed by the specific interfaces such as:

```
my $proc = common::SubProcess::run_cmd($cmd);
my $bool = $proc->start($wait);
my $array = $proc->send($send, $wait[, timeout]);
my $result = $proc->finish( );
```

A wait parameter can contain a string that is expected in the command output stream and is case insensitive.

Remote Commands

A common::RemoteCmd, such as lib/common/RemoteCmd.pm, module can be used for issuing secure shell (ssh) commands to a remote host via a remote session. The remote commands can be sent by instantiating a RemoteCmd object: my $remote=common::RemoteCmd->new($host, $user, $password, $prompt).

After the remote object command has been created, the user can then create a session with the remote host by logging into the remote host. This can be done by calling the login member function, which can take an optional argument containing the number of retries, which can have a default defined, such as 5 retries: my $boolean=$remote->login ([retries]).

If the login fails, an exception can be thrown or generated. After logging in, the remote session can be established and commands can be issued via the session using, for example, the send member function: my $array_ref=$remote->cmd ($command, $prompt, $timeout).

The send member function returns the command output. Once remote services are no longer necessary, the session can be closed by calling the logout member function: my $status=$remote->logout( )

Constants

The common::SmcConstants, lib/common/SmcConstants.pm, module can be a module used to define system wide constants. Any constant that may used across multiple modules can be defined in this model. Non-limiting examples of definitions are function return codes, Boolean values and SMC states.

The common::SmcLog, lib/common/SmcLog.pm, module is a module used to define system wide logging facilities. All SMC logging should be implemented using the common::SmcLog module. If logging is required, the common:: SmcLog module interface should be extended to support the additional requirements.

Logging

A logger can be accessed in a module or script, such as a PERL module or script, by issuing one or more calls, such as by calling the common::SmcLog::get_mylogger member function:

```
use common::SmcLog qw(get_mylogger);
my $logger = get_mylogger( );
```

The logger can provide functionality for logging informational messages, debugging messages, error messages and commands results to the console and/or a log file. The features can be accessed via the logger member functions. After access to the system wide logger is obtained, logging can be handled using, for example, logger member functions:

```
$logger->log_header($header);      # log a section header
$logger->log_step($step, $msg);    # log step and message
$logger->log_result($msg, $res);   # log message and result [ok, pass, succeed, complete, success, etc]
$logger->log_object($msg, $hash, $lvl); # logs message, hash table and level
$logger->blank( );                 # logs a blank line
$logger->log_confess($msg);        # send message to log file
```

Utilities

The common:SmcUtils, lib/common/SmcUtils.pm, modules can be used to define system wide utilities such as parsing, validation and timestamps. Any SMC system wide utility can be available in this module. Any generic utility not available can be added to the Smc::Utils module.

Defined system utilities can include, for example:

```
my $str = trim($string);                    # remove leading and trailed spaces
from given string
my $timestamp = timestamp( );               # return local date time
my $stat = dump_hash($hash, $debug);        # dump a formatted hash
table
my $array = parse_output($lines, $msg, $num, $delim); # parse lines for
expected message
my $stat = validate_attrs($name, $expected, $value, $status); # validate
attributes for expected value
my $stat = index_array($array, $element)    # return array index for a given
array element
my $stat = index_match($array, $element);   #find an array index for an element
```

```
my $ites = find_items($list, $attribute);     # find all items matching attribute in
a list of hash table
my $item = find($list, $items);               # returns first found element
ask user($prompt, $response);# prompt user and return response
my $szcnv = size($sz, $unit);                 # takes string with a media or memory size
and conversion units
my $power2 = round_to_power2($num);           # rounds a number to power
of 2
my $szrnd = round_size($sz);# rounds a string with a media or memory size to a
standard granularity
my $stat = load_module($module);              # used to load a module or package
```

OS Library 206

The OS library 206 can include OS libraries of modules, such as LINUX libraries of PERL modules, which can implement utilities that rely on the OS system facilities or tools for their respective implementations. Non-limiting example modules are described below.

IPMI (Intelligent Platform Management Interface)

IPMI is a set of computer specifications for an autonomous computer subsystem that provides management and monitoring capabilities, which can be independent of the host system's CPU, firmware, and OS.

In some examples, a linux::IpmiTool, lib/linux/IpmiTool.pm, module can contain the interface to the IPMI tool running a Linux client. The IpmiTool can be accessed by instantiating a new IpmiTool with the host, user and password for the remote vendor-specific hardware management system (BMC): my $ipmi=IpmiTool->new($host, $user, $password).

Once an IPMI object is instantiated, IPMI commands can be executed by accessing the IPMI object member functions. A generic interface can be used to execute any IPMI command with a specified timeout and returns the command result: my $ result=$ipmi->cmd($command, $timeout).

BMC passwords can be managed using a set_password and reset_admin_password member functions, such as

```
my $result = $ipmi->set_password($newpasswd);
my $result = $ipmi->reset_admin_password($newpasswd).
```

Some of the commonly used IPMI commands with SMC specific interfaces can be defined, such as the LAN (local area network) interface. The LAN interface has a custom hash defined with a setter and getter function. The hash table can include attributes such as set in progress, ip source, ip address, netmask and gateway:

```
my $lancfg $ipmi->get_lan( );# returns a lan specific hash table
$ipmi->set_lan($attribute, $value); # set a specific hash table parameter.
```

The IPMI object can contain a board management controller (BMC) interface. The BMC interface can use a predefined hash table containing, for example, an ip address, a netmask and a gateway, as well as a setter and getter function:

```
$ipmi->get_bmc( );      # return BMC hash table
$ipmi->set_bmc([dhcp \ default \ static] );    # set BMC interface
according to input.
```

Power supply unit (PSU) information can be returned in a hash by the get_psus member function, such as My $psus=$ipmi->get_psus( );

The PSU hash table can include various attributes, such as part_number—PSU part number and serial_number—PSU serial number.

Hardware Module

The OS library 206 can include a hardware module. For example, the OS library 206 can include a linux::hardware module, lib/linux/Hardware.pm, which can contain a series of server specific utilities. Any routine that handles server specific routines can be defined in this module, such as:

```
my $sn = get_server_sn( );      # returns the server serial number
my $sn = get_chassis_sn( );     # returns chassis serial number
my $mfg = get_manufacturer( );  # return manufacturer
my $ver = get_bios_version( );  # returns current system bios version
my $cpus = get_cpus( );         # returns cpu information
my ($mem, $banks) = get_mems( ); # returns size and banks of memory
information
```

A banks hash can include various attributes such as: manufacturer, part_number, rank, and serial_number.

```
my ($disks, $volumes) = get_volumes($conv, round); # returns disks and virtual drive hash
```

The volumes hash can include various attributes such as: device, type, size, mount, and label.

```
my $disks = get_hw_disks( ); # returns disk information hash
```

The disk hash can include various attributes such as: descr (e.g., description), name, device, size, and rawsize.

```
my $vols = get_hw_volumes( );       # returns volume information
```

The hardware volumes hash can include various attributes such as: description, vendor, ID, device, mount, version, size, and configuration.

```
my $ctrlr = get_controller( ); # return storcli controller info
my $ver = get_eth_fw($dev); # returns the firmware version for the given device
my $bus = get_pci_bus($kw);       # returns the PCI bus for the given keyword
my $ids = get_pci_ids($devid);      # returns the PCI device id
```

System Module

The OS library 206 can also include a system module. For example, the OS library 206 can include a OS::System, lib/OS/System.pm, module which can define system level utilities and functions used to obtain OS level system information. The utilities defined can be used to query OS information and/or perform OS system tasks. Non-limiting examples include:

```
my $ip = get_ip([$ifc]);         # return IPV4 IP address
my $ips = get_ips([$ifc]);        # return all IPV4 IP addresses
get_eth([$ifc]);         # returns the connected Ethernet interface
check_dhcp( ); # determines if DHCP is configured
my $public = is_public(,$ip]);        # determines if an IP address is public or private
my $ip = set_static_ip($ip[, $mask]);       # sets the static IPV4 IP and mask if supplied
my $count = ping($host);       # pings the remote host
my $synced = sync_time( );       # tries to sync the time with NTP host
my $result = set_time($time);      # sets time to an ISO formatted timeies
my $tm = get_utc_time( );       # returns ISO formatted time
reboot( );             # tries to reboot the server
my $proc = find_process($pid);        # return process info for given pid
my $result = mount($dev, $mnt);        # mounts device on given mount point
my $result = un_mount($mnt);         #unmounts given mount point
my $result = re_mount($dev, $opts);   # remounts device with given options
my $result = rename($old, $new);      # renames file
my $output = read_file($file, [cat \ more]); # reads file without or with pagination
my $output = find_files($path, $kw);#finds files at path containing keyword
my $result = set_next_boot($dev);     # sets device to be used by boot loader for next boot
```

Disks and Interfaces Module

The OS library 206 can also include modules for configuring disks or interfaces. For example, the OS library 206 can include a OS::MegaRaid, lib/OS/MegaRaid.pm, module which can define the interfaces used to configure and check a MegaRaid storage adapter. The OS::MegaRaid can provide high level interface to return configuration information, set the configuration and RAID initialization status:

```
my $config = get_raid_adapter($adp); # return RAID adapter hash table
```

The RAID adapter hash table can include various attributes such as: AdapterBios, SSD_Match, SS_Left, HDD_Match, Name, FW_Rev, RebuildRate, EnaSpinDownUD, DisSpinDownUD, CoercionMode, EnclosureID, HDD_Count, SSD_Count, and HDD_Size.

```
my $vdisks = get_virtualdrives($adp);
my $result = raid_clear_config($adp);    # clear RAID config for given adapter
my $result = raid_set_rebuild_rate($per, $adp); # set adapter rebuild rate
my $result = raid_set_bios([enable \ disable], $adp); # set bios state
my $result = raid set_powersave([ enable \ disable], $adp);# set adapter power save state
my $result = raid_set_disable_spindown([enable \ disable], $adp); #set adapter spin down
my $result = raid_set_coersion_mode($mode, $adp);# set adapter coercion mode
my $result = raid_create_logical_disk($raid, $enc, $start, $num, $options, $size, $adp);
my $result = raid_create_logicalspan($raid, $enc, $span1, $span2, $spanlen, $options, $size, $adp);
my $result = raid_start_init($adp);    # start raid initialization
my $result = cleanup_adapter($adp);    # clear config and disable JBOD mode
```

Platform Library 208

Platform library 208 can include modules and/or scripts for handling platform-specific routines. For example, the platform library 208 can include a platform library platform::SmcPlatform module which handles the platform specific routines. The SmcPlatform module can handle the platform interface. In addition to the SmcPlatform, interface subdirectories can be included with Vendor1, Vendor2, or Vendor3 specific modules, for example. Other modules can be included that are specific to a relevant platform, such as x86 or x64 architectures, for example.

A platform::SmcPlatform, lib/platform/SmcPlatform.pm, module can contain all platform specific functions. Non-limiting examples of platform utility functions include:

```
my ($cfg, $commoncfg) = get_plafform_cfg( ); # returns a hash tables with platform specific attributes
my $plafform = smc_plafform_check( );  # returns SimpliVity plafform validation check
my ($ssd, $hdd) = get_drive_count( );    # return respective drive counts
my ($user, $pass) = get_admin( );        # return admin credentials
my $bmc = bmc_class( );                  # returns platform specific BMC type
```

The discussion above includes example commands and references to specific utilities, modules, operating systems, and/or components. It should be noted that these examples are non-limiting examples provided for the sake of clarity and explanation, and other examples which may not be explicitly referenced herein are within the spirit of the disclosure and are contemplated herein.

Figure 3A:
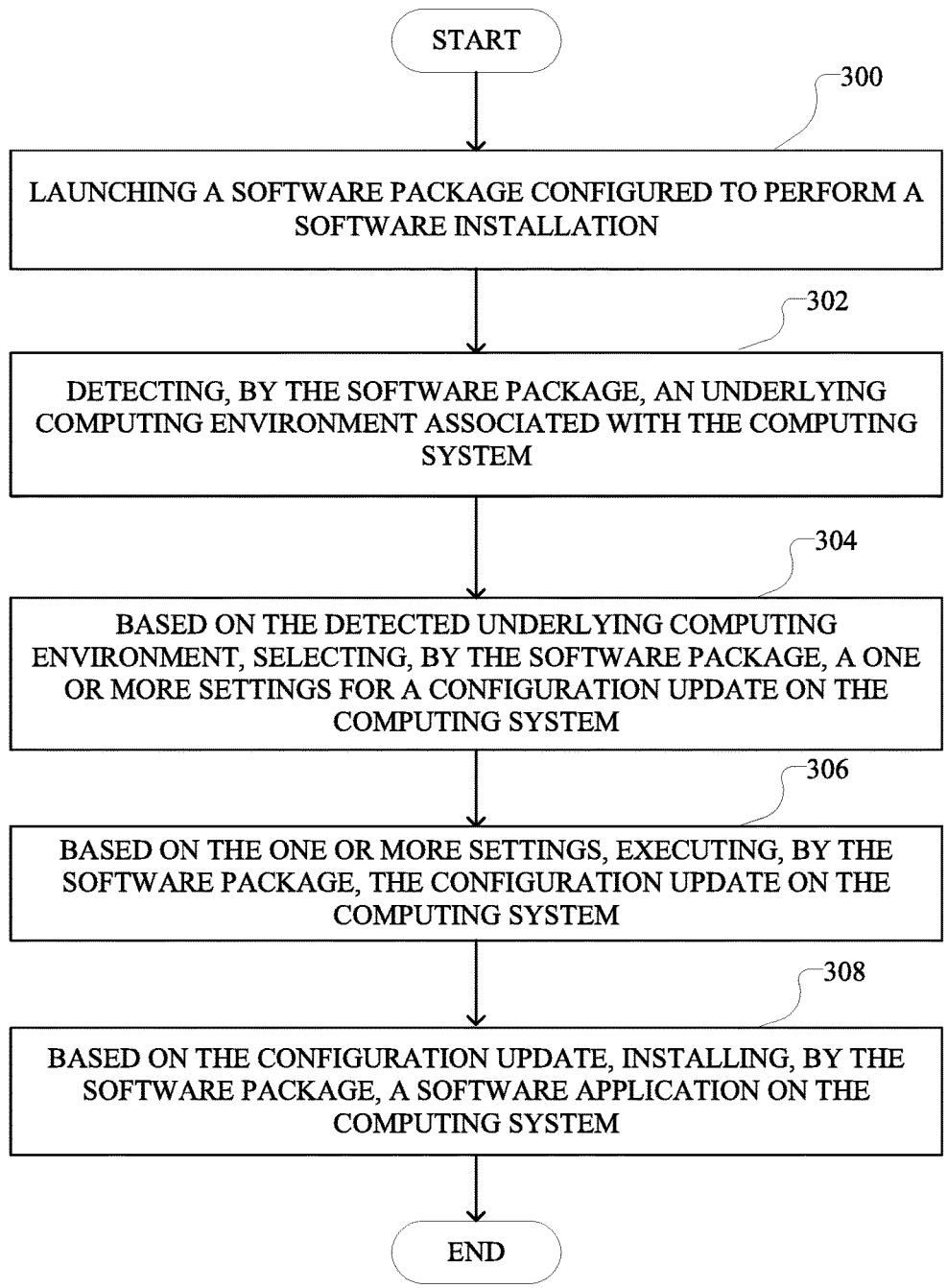
FIG. 3A illustrates an example method for installing software via a multi-platform software installation tool.
Figure 3B:
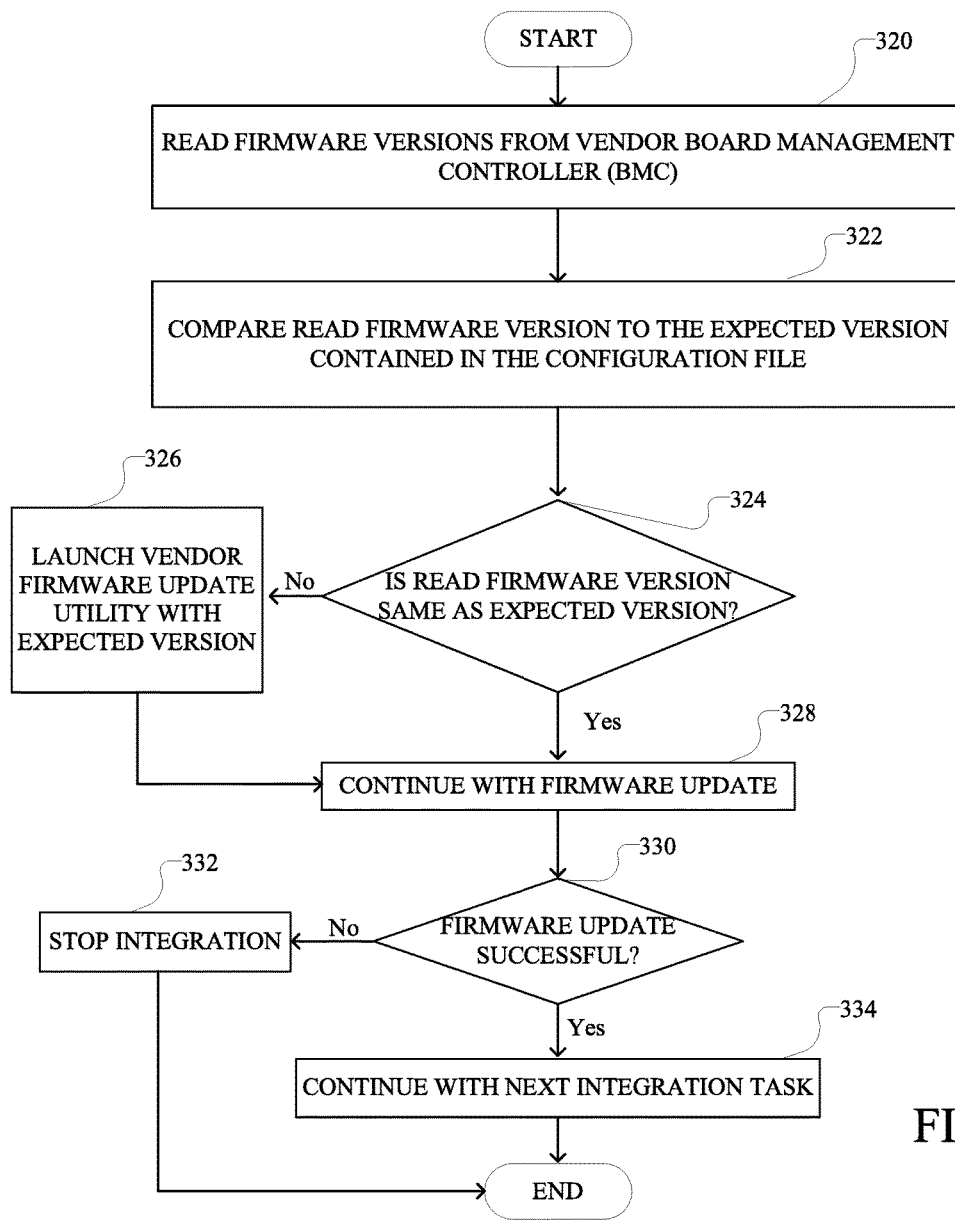
FIG. 3B illustrates an example flowchart for a firmware update process.

Having disclosed some basic system components and concepts, the disclosure now turns to the example methods shown in FIGS. 3A and 3B. For the sake of clarity, the methods are described in terms of a software tool based on the architecture 200 as illustrated in FIG. 2. The steps outlined herein are exemplary and can be implemented in any combination thereof, including combinations that exclude, add, or modify certain steps.

Referring to FIG. 3A, at step 300, a system can launch a software package configured to perform a software installation. The software package can be a multi-platform software installation tool that is capable of installing a software application on the system, installing a firmware patch or update on the system, and/or implementing a configuration update on the system, regardless of the particular platform (e.g., vendor or manufacturer, system model, etc.) of the system. Thus, the software package can be agnostic to the type of platform or environment, and capable of tailoring the installation and configuration tasks to the particular platform of the system.

In some cases, the software package can be launched from a memory device, such as a universal serial bus (USB) memory device. Moreover, the software package can be bootable from the memory device. In other cases, the software package can be launched via a preboot execution environment (PXE). Further, the software package can be similarly bootable via the PXE environment.

At step 302, the software package can detect an underlying computing environment associated with the system. The software package can detect the underlying computing environment in order to tailor the installation and configuration process to the specific underlying computing environment of the system. The underlying computing environment detected can include a type of system, software characteristics of the system, hardware characteristics of the system, etc. The type of system, the software characteristics, and the hardware characteristics of the underlying computing environment can include the system platform and/or configuration.

The system platform of the detected underlying computing environment can include the type of system, the vendor name associated with the system, the system architecture (e.g., chipset, number of CPUs, type of CPUs, the computing environment such as 32-bit or 64-bit environment, type of interfaces such as PCIe, etc.).

The system configuration of the detected underlying computing environment can include a hardware inventory of disk or RAID adapter(s), a number of physical disks, the respective sizes of the physical disks, a number of SSD drives, the respective sizes of the SSD drives, an amount and/or type of memory on the system, a number and/or type of network interface cards on the system, a number and/or type of logical disks, a respective size of the logical disks, an OS type, and so forth.

The system platform and configuration can also include other details, such as BIOS type and/or settings, system libraries, OS environment, system services, kernel modules, filesystem, etc.

Based on the detected underlying computing environment, at step 304, the software package can select one or more settings for a configuration update on the system. The one or more settings can define network configuration parameters, system firmware parameters, boot parameters, physical and/or logical disk configuration parameters, CPU parameters, memory parameters, programming parameters, power supply settings, performance settings, etc.

At step 306, the software package can execute the configuration update on the system based on the one or more settings. Thus, the software package can determine settings to implement through the configuration update, and perform the configuration update accordingly. The configuration update can be tailored to the system, including the system platform and configuration.

The configuration update can involve, for example, creating and configuring virtual disks, configuring physical disks, applying disk or drive parameters, configuring network settings, implementing performance attributes, configuring memory attributes, implementing boot parameters, applying software setup parameters, applying OS parameters, applying power supply parameters, applying other software or hardware parameters, etc.

Based on the configuration update, at step 308, the system can install a software application on the system. The software application can be installed in the physical environment of the system, the OS of the system, and/or a virtualized environment of the system, such as a VM or software container. In some cases, the configuration update can allow the software package to install the software application on the system, and may allow the system to be tailored or optimized to run the software application.

Moreover, the software application installed by the software package can vary in different implementations. In some cases, the software package can use the information about the detected underlying computing environment, including the platform and configuration details such as physical disk count, physical disk size, SSD disk count, SSD disk size, etc., and/or the one or more settings to determine the model type, configuration, and/or features of the software application to be installed by the software package.

In some cases, the software package can determine, based on the detected underlying computing environment, whether one or more firmware updates are available or necessary. For example, the software package can determine the current firmware version of the system and identify the latest version of the firmware to determine if any firmware updates are available. In other examples, the software package can determine whether any other modifications, such as patches, should be made. The firmware version for the system can be determined, for example, by using a respective BMC interface associated with the system's vendor.

Firmware updates can include newer versions of firmware but can also include older versions of firmware. For example, a firmware update can entail rolling back the firmware to a previous version. This can be necessary in some cases to correct certain errors or conflicts, for example.

When the software package determines one or more firmware updates are available, the software package can select to execute the one or more firmware updates on the system. Thus, the software package can update and/or modify the system firmware. The firmware can be updated based on the underlying computing environment and/or the system configuration. Moreover, the firmware can be selected or installed based on the software application to be installed by the software package.

In some cases, the software package can install or update the firmware on the system prior to installing the software application and/or executing the configuration update. However, in other cases, the software package can install or update the firmware on the system after installing the software application and/or executing the configuration update.

The software package can perform an inspection procedure. The inspection procedure can involve verifying that physical assembly, hardware, firmware, BIOS settings, RAID or disk configuration, software, etc., are consistent with an acceptance guide associated with the vendor and/or the software application. The acceptance guide can define requirements, specifications, configurations, etc.

FIG. 3B illustrates a flowchart of an example firmware update process. At step 320, the system can read firmware versions from the vendor BMC. At step 322, the system can compare the read firmware version to the expected version contained in the configuration file (e.g., XML file). The configuration file can contain the relevant firmware settings for every platform in the respective <firmware>section of the configuration files.

At step 324, the system can determine if the read firmware version is the same as the expected firmware version. If the read firmware version is not the same as the expected firmware version, at step 326, the system can launch the vendor firmware updated utility with the expected firmware version. On the other hand, if the read firmware version is the same as the expected firmware version, at step 328, the system can continue with the firmware update.

At step 330, the system can check if the firmware update is successful. If the firmware update is not successful, at step 332, the system can stop the integration. If the firmware update is successful, at step 334, the system can continue with the next integration task.

The disclosure now turns to FIGS. 4A-B, which illustrate example computing systems for using a software package or tool as described herein. The more appropriate embodiment will be apparent to those of ordinary skill in the art when practicing the present technology. Persons of ordinary skill in the art will also readily appreciate that other system embodiments are possible.

FIG. 4A illustrates a system bus computing system architecture 400 wherein the components of the system are in electrical communication with each other using a bus 405. Exemplary system 400 includes a processing unit (CPU or processor) 404 and a system bus 406 that couples various system components including the system memory 420, such as read only memory (ROM) 418 and random access memory (RAM) 416, to the processor 404. The system 400 can include a cache of high-speed memory connected directly with, in close proximity to, or integrated as part of the processor 404. The system 400 can copy data from the memory 420 and/or the storage device 408 to the cache 402 for quick access by the processor 404. In this way, the cache can provide a performance boost that avoids processor 404 delays while waiting for data. These and other modules can control or be configured to control the processor 404 to perform various actions. Other system memory 420 may be available for use as well. The memory 420 can include multiple different types of memory with different performance characteristics. The processor 404 can include any general purpose processor and a hardware module or software module, such as module 1 410, module 2 412, and module 3 414 stored in storage device 408, configured to control the processor 404 as well as a special-purpose processor where software instructions are incorporated into the actual processor design. The processor 404 may essentially be a completely self-contained computing system, containing multiple cores or processors, a bus, memory controller, cache, etc. A multi-core processor may be symmetric or asymmetric.

To enable user interaction with the computing device 400, an input device 422 can represent any number of input mechanisms, such as a microphone for speech, a touch-sensitive screen for gesture or graphical input, keyboard, mouse, motion input, speech and so forth. An output device 424 can also be one or more of a number of output mechanisms known to those of skill in the art. In some instances, multimodal systems can enable a user to provide multiple types of input to communicate with the computing device 500. The communications interface 426 can generally govern and manage the user input and system output. There is no restriction on operating on any particular hardware arrangement and therefore the basic features here may easily be substituted for improved hardware or firmware arrangements as they are developed.

Storage device 408 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 416, read only memory (ROM) 418, and hybrids thereof.

The storage device 408 can include software modules 410, 412, 414 for controlling the processor 404. Other hardware or software modules are contemplated. The storage device 408 can be connected to the system bus 406. In one aspect, a hardware module that performs a particular function can include the software component stored in a computer-readable medium in connection with the necessary hardware components, such as the processor 404, bus 406, display 424, and so forth, to carry out the function.

FIG. 4B illustrates an example computer system 450 having a chipset architecture that can be used in executing the described method and generating and displaying a graphical user interface (GUI). Computer system 450 is an example of computer hardware, software, and firmware that can be used to implement the disclosed technology. System 450 can include a processor 452, representative of any number of physically and/or logically distinct resources capable of executing software, firmware, and hardware configured to perform identified computations. Processor 452 can communicate with a chipset 454 that can control input to and output from processor 452. In this example, chipset 454 outputs information to output 462, such as a display, and can read and write information to storage device 464, which can include magnetic media, and solid state media, for example. Chipset 454 can also read data from and write data to RAM 466. A bridge 456 for interfacing with a variety of user interface components 585 can be provided for interfacing with chipset 454. Such user interface components 458 can include a keyboard, a microphone, touch detection and processing circuitry, a pointing device, such as a mouse, and so on. In general, inputs to system 450 can come from any of a variety of sources, machine generated and/or human generated.

Chipset 454 can also interface with one or more communication interfaces 460 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 452 analyzing data stored in storage 464 or 466. Further, the machine can receive inputs from a user via user interface components 458 and execute appropriate functions, such as browsing functions by interpreting these inputs using processor 452.

It can be appreciated that example systems 400 and 450 can have more than one processor or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
   launching, by a computing system a multi-platform installer that is agnostic to a type of an underlying computing environment associated with the computing system;
   detecting, by the multi-platform installer launched by the computing system, the underlying computing environment, the underlying computing environment comprising a type of system, software characteristics, and hardware characteristics;
   based on the underlying computing environment detected by the multi-platform installer, selecting, by the multi-platform installer, one or more settings for a configuration update on the computing system, the one or more settings defining network configuration parameters, system firmware parameters, drive configuration parameters, or system boot drive configuration parameters;
   based on the one or more settings, executing, by the multi-platform installer, the configuration update on the computing system; and
   based on the configuration update, installing, by the multi-platform installer, a software application on the computing system,
   wherein executing the configuration update, which is based on the one or more settings selected based on the underlying computing environment detected by the multi-platform installer launched by the computing system, tailors the computing system to run the software application.

2. The method of claim 1, wherein the type of system comprises a system vendor, and wherein the hardware characteristics comprise a system hardware configuration.

3. The method of claim 2, wherein the system hardware configuration comprises at least one of a first number of physical disks, a second number of solid state disks, a first respective size of each of the physical disks, a second respective size of each of the solid state drives.

4. The method of claim 3, wherein at least one of the first number of physical disks and the second number of solid state drives comprises a redundant array of independent disks (RAID).

5. The method of claim 3, wherein the system hardware configuration further comprises a chipset type associated with the computing system.

6. The method of claim 2, further comprising generating, by the multi-platform installer, one or more logical drives based on the underlying computing environment detected by the multi-platform installer.

7. The method of claim 6, wherein generating the one or more logical drives comprises determining a logical configuration for the one or more logical drives, a number of physical disks for the one or more logical drives, a respective size of the one or more logical drives, and respective attributes for the one or more logical drives.

8. The method of claim 7, wherein the logical configuration comprises a redundant array of independent disks (RAID) configuration, and wherein the system hardware configuration further comprises processor settings, network interface settings, and power supply settings.

9. The method of claim 1, further comprising:
   based on the detected underlying computing environment, determining, by the multi-platform installer, whether a firmware update is available; and
   responding to a determination that the firmware update is available by, executing, by the multi-platform installer, the firmware update on the computing system.

10. The method of claim 9, wherein the determining whether the firmware update is available includes reading a firmware version from a baseboard management controller of the computing system and determining that the firmware update is available if the firmware version from the baseboard management controller does not match an expected firmware version.

11. The method of claim 9, wherein the firmware updates includes rolling back firmware of the computing system to a previous version.

12. The method of claim 1, further comprising determining, by the multi-platform installer, a configuration of the software application for the installing, based on the underlying computing environment detected by the multi-platform installer.

13. The method of claim 1, wherein the software application is virtualization software.

14. The method of claim 1, wherein the software application is installed on a virtualized environment of the computing system.

15. The method of claim 1, where the launching is via a universal serial bus memory device or a preboot execution environment.

16. The method of claim 1, further comprising inspecting, by the multi-platform installer, the underlying computing environment for consistency with an acceptance guide associated with the software application.

17. A system comprising:
   a processor; and
   a non-transitory computer-readable storage medium storing instructions that, when executed by the processor, cause the processor to perform operations comprising:
      launching a multi-platform installer that is agnostic to a type of an underlying computing environment of a computer on which the multi-platform installer is launched;
      detecting, by the multi-platform installer launched on the computer, the underlying computing environment, the underlying computing environment comprising a type of system, software characteristics, and hardware characteristics;
      based on the underlying computing environment detected by the multi-platform installer, selecting, by the multi-platform installer, one or more settings for a configuration update on the computer, the one or more settings defining network configuration parameters, system firmware parameters, drive configuration parameters, or system boot drive configuration parameters;
      executing, by the multi-platform installer, the configuration update on the computer; and based on the configuration update, installing, by the multi-platform installer, a software application on the computer, wherein executing the configuration update, which is based on the one or more settings selected based on the underlying computing environment detected by the multi-platform installer, tailors the computer to run the software application.

18. The system of claim 17, wherein the system hardware configuration further comprises processor settings, network interface settings, and power supply settings.

19. The system of claim 17, wherein the type of system comprises a system vendor,
wherein the hardware characteristics comprise a system hardware configuration, and
wherein the system hardware configuration comprises at least one of a first number of physical disks, a second number of solid state disks, a first respective size of each of the physical disks and the solid state disks.

20. The system of claim 19, wherein the non-transitory computer-readable storage medium stores instructions that, when executed by the processor, cause the processor to perform operations comprising:
generating, by the multi-platform installer, one or more logical drives based on the underlying computing environment, wherein generating the one or more logical drives comprises determining a logical configuration for the one or more logical drives, a number of physical disks for the one or more logical drives, a respective size of the one or more logical drives, and respective attributes for the one or more logical drives.

21. A non-transitory computer-readable storage medium having stored therein instructions that, when executed by a processor, cause the processor to perform operations comprising:
launching, by a computing system, a multi-platform installer that is agnostic to a type of an underlying computing environment associated with the computing system and the;
detecting, by the multi-platform installer launched by the computing system, the underlying computing environment, the underlying computing environment comprising a type of system, software characteristics, and hardware characteristics;
based on the underlying computing environment detected by the multi-platform installer, selecting, by the multi-platform installer, one or more settings for a configuration update on the computing system, the one or more settings defining network configuration parameters, system firmware parameters, drive configuration parameters, or system boot drive configuration parameters;
based on the one or more settings, executing, by the multi-platform installer, the configuration update on the computing system; and
based on the configuration update, installing, by the multi-platform installer, a software application on the computing system,
wherein executing the configuration update, which is based on the one or more settings selected based on the underlying computing environment detected by the multi-platform installer launched by the computing system, tailors the computing system to run the software application.

22. The non-transitory computer-readable storage medium of claim 21, wherein the type of system comprises a system vendor,
wherein the hardware characteristics comprise a system hardware configuration, and
wherein the system hardware configuration further comprises processor settings, network interface settings, and power supply settings.

23. The non-transitory computer-readable storage medium of claim 22, wherein the system hardware configuration comprises at least one of a first number of physical disks, a second number of solid state disks, a first respective size of each of the physical disks or the solid state disks.

24. The non-transitory computer-readable storage medium of claim 23, wherein at least one of the first number of physical disks and the second number of solid state drives comprises a redundant array of independent disks (RAID), wherein the system hardware configuration further comprises processor settings, network interface settings, and power supply settings.

25. The non-transitory computer-readable storage medium of claim 24, storing additional instructions that, when executed by the processor, cause the processor to perform operations further comprising generating, by the multi-platform installer, one or more logical drives based on the underlying computing environment detected by the multi-platform installer.

26. The non-transitory computer-readable storage medium of claim 21, storing additional instructions that, when executed by the processor, cause the processor to perform operations further comprising:
determining, by the multi-platform installer, whether a firmware update is available; and
when the multi-platform installer determines that the firmware update is available, executing, by the multi-platform installer, the firmware update on the computing system.

* * * * *